United States Patent [19]

Ott et al.

[11] 4,122,733
[45] Oct. 31, 1978

[54] HOSE CLAMP APPLYING AND REMOVING MACHINE

[75] Inventors: John E. Ott, Oak Brook; Marvin O. Bates, Bensenville, both of Ill.

[73] Assignee: Punch-Lok Company, Chicago, Ill.

[21] Appl. No.: 820,433

[22] Filed: Aug. 1, 1977

[51] Int. Cl.² .............................................. B25B 27/10
[52] U.S. Cl. ......................................... 81/9.3; 100/29; 254/79
[58] Field of Search ............... 81/9.3; 100/29 XR, 32, 100/33; 140/93.2, 93.4; 254/79

[56] References Cited

U.S. PATENT DOCUMENTS

| | | | |
|---|---|---|---|
| 2,729,994 | 1/1956 | Hewitt et al. | 81/9.3 |
| 2,837,949 | 6/1958 | Looholm | 81/9.3 |
| 3,027,788 | 4/1962 | Ott et al. | 81/9.3 |

Primary Examiner—Al Lawrence Smith
Assistant Examiner—James G. Smith
Attorney, Agent, or Firm—Vogel, Dithmar, Stotland, Stratman & Levy

[57] ABSTRACT

A hose clamp machine includes a frame carrying a reciprocating air motor, the piston shaft of which is coupled to one end of a lever which is pivoted approximately midway between the ends thereof on the frame, the other end of the lever being coupled by linkage to a band puller housing for slidably reciprocating it along a slide rod. A hose with a hose clamp band looped thereabout is mounted beneath the distal end of the slide rod with the free end of the band fed through a ratchet-type holding dog to a pulling dog in the puller housing. Pivotal movement of the lever during a driving stroke of the motor pulls the puller housing to tension the band, after which a punch head is driven into the band collar to lock the clamp in the tensioned condition about the hose. Cushioning means is provided on the piston shaft to cushion the driving stroke when the band is severed while under tension. Pressurized air is supplied to the motor through regulating and valve means via conduits having a diameter such as to slow down the air stream to control the speed of the drive motor. Cutting means on the puller housing and the frame cooperate to sever and remove a clamp collar disposed therebetween. Pivotal stop means on the slide rod is movable into engagement with the puller housing for holding it in the desired position for performing the severing operation.

13 Claims, 7 Drawing Figures

HOSE CLAMP APPLYING AND REMOVING MACHINE

BACKGROUND OF THE INVENTION

The present invention relates to tools for pulling and tensioning metal bands and locking them in their tensioned condition, and more particularly to an improved power-operated machine that is especially useful in the securing of hose clamps about rubber hoses or other conduits and the like.

The present invention is an improvement of the hose clamping machine disclosed in U.S. Pat. No. 3,027,788, issued to J. E. Ott et al. on Apr. 3, 1962, and assigned to the assignee of the present invention, the disclosure of which patent is incorporated herein by reference. That prior device has a clamp pulling assembly which is driven by an air motor and has a very short stroke, approximately ⅜ inch, so that tensioning a band to the desired tension requires reciprocation of the pulling means through a succession of alternating band-pulling and return strokes. Special control valve means is necessary to cause the drive motor automatically to continue reciprocating until the desired tension is reached, in response to a single application of the control valve. Consequently, the drive assembly is quite complicated and expensive.

The prior machine also includes a clamp cutting or severing mechanism which is coupled to the drive motor drive linkage for movement therewith to sever the collar of a tension clamp and remove the clamp from an associated hose. That severing means is nonadjustable and can be utilized only for a single size of band collar.

SUMMARY OF THE INVENTION

The present invention is an improved hose clamp applying and removing machine which overcomes the disadvantages of the prior machines, while retaining all of the advantages thereof.

More particularly, it is an important feature of the present invention that the drive linkage is so arranged that the band-pulling apparatus has a longer stroke, sufficient substantially to completely tension the associated band to the desired tension in a single drive stroke of the drive motor. By reason of this feature, the present invention utilizes a much simpler type of drive motor and control valving apparatus, wherein the control valve is selectively operable independently to control each stroke of the drive motor.

It is another feature of the present invention that the machine includes an improved cushioning mechanism for the drive motor piston shaft to cushion the drive stroke when the associated band is severed while under tension.

Another feature of this invention is the provision of drive fluid supply means and associated conduits which provide sufficient friction to the flow of drive fluid to control the speed of operation of the drive motor.

It is another feature of this invention that the band collar severing means is coupled to the band puller housing for movement therewith, stop means being provided for engaging the puller and preventing its return to its retracted position and holding it in the predetermined cutting position for cutting a particular size of band collar.

The present invention also includes regulating means for regulating the air pressure to operate the machine at different pressures in the band tensioning and collar-severing modes.

These features are provided, and it is an important object of the present invention to attain these advantages by the provision of a hose clamp applying machine for producing a predetermined tension in the metal band of a hose clamp, the machine comprising a slide member, band-pulling means mounted for sliding reciprocation on the slide member and adapted to engage the band, a reciprocating drive motor, and drive linkage interconnecting the drive motor and the band-pulling means and mounted for pivotal movement about a fixed axis disposed substantially normal to the direction of the slide member, the fixed axis being spaced from the slide member a distance such that the drive linkage is responsive to a single drive stroke of the drive motor for driving the band-pulling means along the slide member a distance sufficient completely to tension the associated band to the predetermined tension.

Further features of the invention pertain to the particular arrangement of the parts of the hose clamp applying and removing machine whereby the above-outlined and additional operating features thereof are attained.

The invention, both as to its organization and method of operation, together with further objects and advantages thereof, will best be understood by reference to the following specification taken in connection with the accompanying drawings.

DESCRIPTION OF THE PREFERRED EMBODIMENT

For purposes of illustration, the hose clamp shown as being acted upon by the machine of the present invention is a clamp generally of the kind shown in U.S. Pat. No. 2,312,575, issued to C. H. McKee. In the present drawings, the letter A designates a hose, which may be of rubber or the like, and the letter B designates a metal nipple or hose coupling inserted into the hose, the two being secured together by means of a clamp. The clamp itself is comprised of a length of pliable metal band, one portion of the band being wound on itself to form a two-ply ring C. The plyes or coils of the ring C include outer and inner lapped end portions with the intermediate ply or coil lying between them. The clamp also includes a band-like collar D which transversely embraces the lapped end portions and the intermediate coil. The lapped end of the inner coil is bent backward on itself to form a hook C' (FIGS. 6 and 7) that anchors the inner coil to the inner limb of the collar D which it embraces, and comtinuous with the outer coil there is a straight tangential extension or free end portion E that passes under the outer limb of the collar D and is engaged by the tensioning and punching apparatus of the present invention in order that the band may be pulled so as to reduce the diameter of the ring C and tighten the ring about the hose A. This, of course, will clamp the hose A onto the nipple B.

Figure 1:
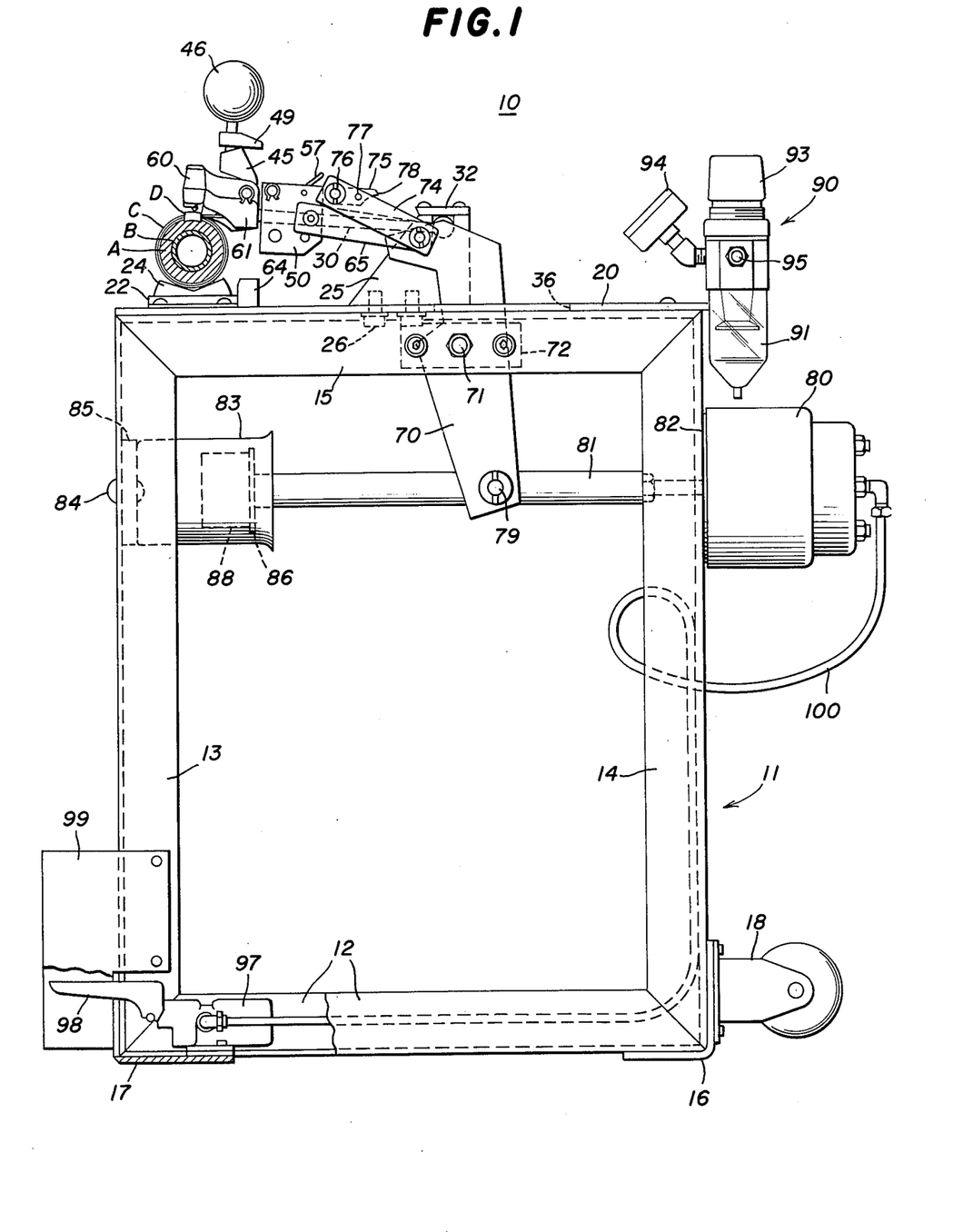
FIG. 1 is a side elevational view, in partial vertical section, of the hose clamp applying and removing machine constructed in accordance with and embodying the features of the present invention.
Figure 2:
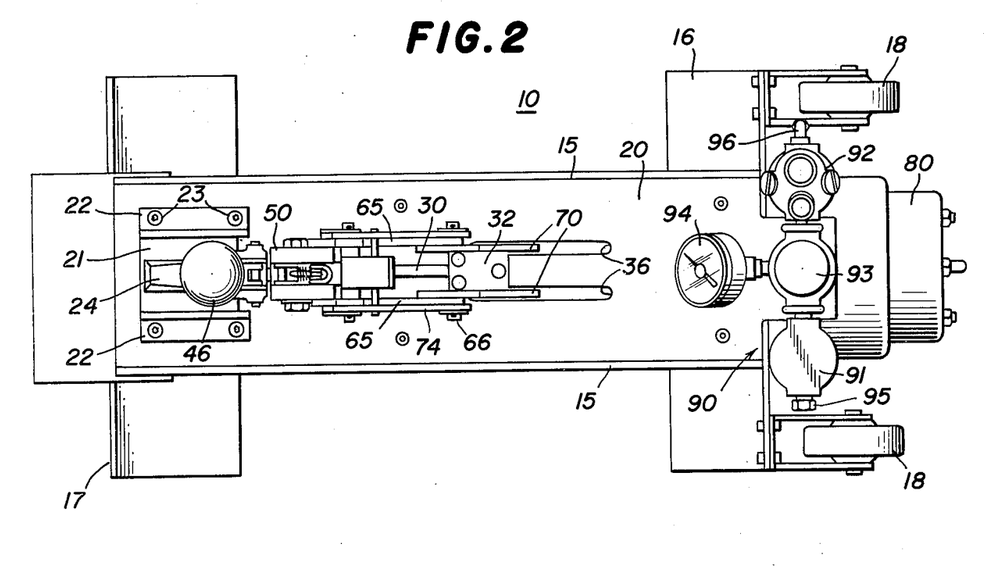
FIG. 2 is a top plan view of the machine illustrated in FIG. 1.
Figure 3:
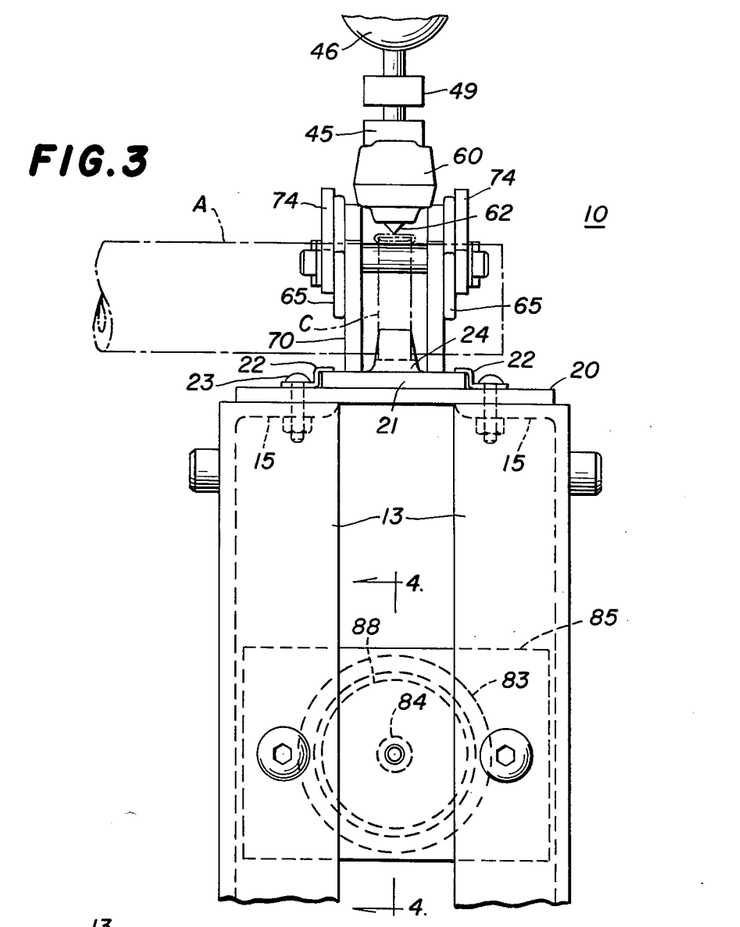
FIG. 3 is an enlarged fragmentary front elevational view of the machine illustrated in FIG. 1.

Referring to FIGS. 1—3 of the drawings, there is illustrated a hose clamp applying and removing machine, generally designated by the numeral 10, which includes a rigid upstanding base assembly 11, the frame for which is preferably of rectangular form and includes a pair of laterally spaced-apart bottom angle members 12 respectively secured as by welding at one end thereof to a pair of spaced-apart upstanding front angle members 13, and respectively secured as by welding at the other ends thereof to a pair of upstanding rear angle members 14, with the front and rear angle members 13 and 14 being respectively interconnected at the upper ends thereof by a pair of top angle members 15. Also interconnecting the bottom angle members 12 and the rear angle members 14 at the adjoining ends thereof is a rear angle brace plate 16. In like manner, the bottom angle members 12 and the front angle members 13 are interconnected at the adjoining ends thereof by a front angle brace plate 17.

The brace plates 16 and 17 extend laterally outwardly well beyond the outer sides of the bottom angle members 12 and, if desired, the horizontal legs of these brace plates may receive suitable fasteners therethrough for attaching the machine 10 to the floor. Also, the upstanding flange of the rear brace plate 16 has secured thereto adjacent to the ends thereof and outboard of the rear angle members 14 two casters 18 to facilitate movement of the machine 10 from place to place. Also, it will be appreciated that, if desired, additional brace means may be utilized to interconnect the front angle members 13 or the rear angle members 14 to provide additional stability for the frame 11.

Overlying the horizontal flanges of the top angle members 15 and fixedly secured thereto as by welding or other means for interconnection thereof is a tool baseplate 20, which is generally rectangular in shape. Slidably mounted on the front portion of the tool baseplate 20 is a work receiving block 21 which is guided between a pair of way members or gibs 22 secured in place on the tool baseplate 20 by cap screws 23. The work receiving block 21 has a V-shaped work seat 24 thereon which is shaped so as to receive and hold a hose A or other item that is to have a metal band or hose clamp secured thereabout. If desired, a shock pad (not shown) of nylon or the like may be disposed between the bottom of the work receiving block 21 and the upper surface of the tool baseplate 20 so as to absorb the shock that occurs when the collar D and the lapped ends of the band C therein are punched, as hereinafter described, in order to secure the tightened coils in their tensioned condition.

Figure 6:
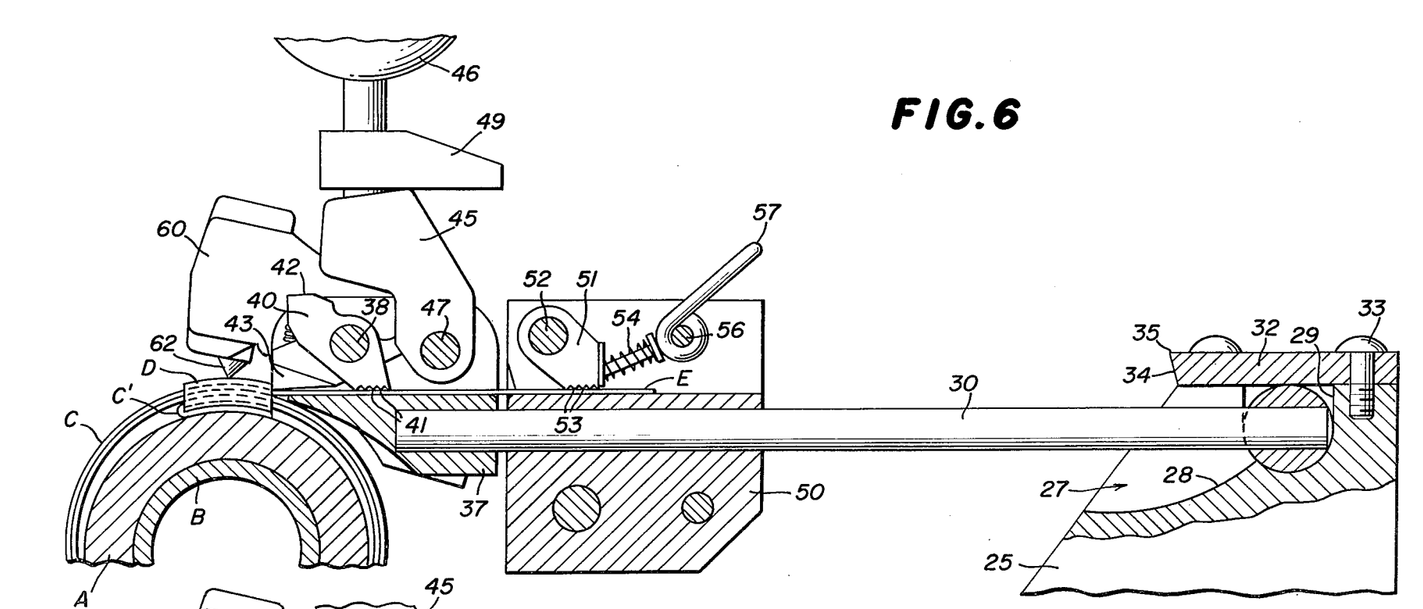
FIG. 6 is a greatly enlarged fragmentary side elevational view in partial vertical section of the band or clamp tensioning apparatus at the top of the machine, the parts being shown in the position which they occupy just as the machine is about to make a tensioning stroke.
Figure 7:
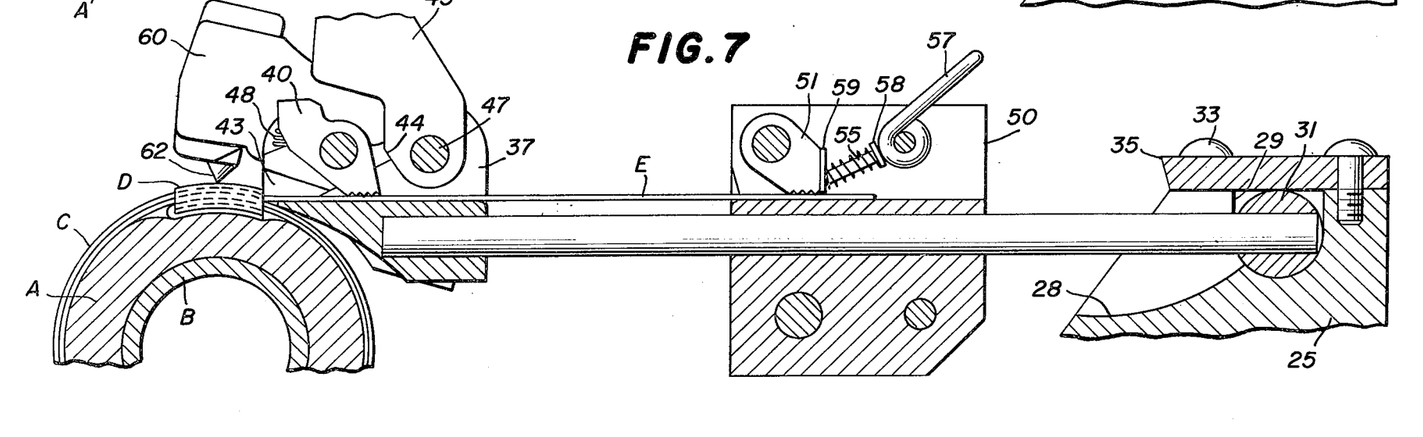
FIG. 7 is a view similar to FIG. 6, but showing the parts in the position which they occupy when the machine has completed a tensioning stroke in its cycle of operation.

Referring now also to FIGS. 6 and 7 of the drawings, an upstanding tool pivot block 25 is secured upon the upper surface of the tool baseplate 20 rearwardly of the work receiving block 21 as by cap screws 26 that extend upwardly through the top angle members 15 and through the tool baseplate 20 and are threaded into the bottom of the pivot block 25. Formed in the upper portion of the tool pivot block 25 is a T-shaped slot 27 having a forwardly extending leg 28 and a transversely extending leg 29. As shown in FIG. 6, the bottom of the transversely extending leg 29 of the T-shaped slot 27 is rounded to provide a bearing surface, and the floor of the forwardly extending leg 28 is milled or otherwise formed so that it slopes forwardly and downwardly. The transversely extending leg 29 pivotally receives a short cylindrical stub shaft 31 which has fixed therein an elongated cylindrical rod 30 that projects forwardly through the leg 28 of the slot 27, the stub shaft 31 being pivotally retained by a cap plate 32 secured to the top of the pivot block 25 as by buttonhead screws 33. The forward face 34 of this cap plate 32 extends upwardly at an angle of about 75 degrees with respect to the horizontal so that the forward edge of the plate will serve as a cutting or severing edge 35 for purposes that will be hereinafter explained. Respectively formed in the tool baseplate 20 and extending longitudinally thereof along the opposite sides of the tool pivot block 25 are two elongated slots 36 for a purpose to be described below.

The rod 30 extends forwardly to a position adjacent to the work receiving block 21 and has fixedly secured to the forward end thereof a forging 37, the upper portion of which is of channel shape in cross section, with the flat top surface of the lower solid portion forming, in part, a slideway for the extension or free end portion E of the hose clamp which is inserted into the machine 10. Pivoted on a cross pin 38 mounted in and between the side walls of the channel forging 11 is a yoke-shaped holding dog 40 having teeth 41 formed on the lower ends of its two legs which engage the free end portion E of the hose clamp when the free end portion E is received in the machine 10. Formed on the upper end of the holding dog 40 is a bearing surface 42. Also pivoted on the cross pin 38 between the legs of the yoke-shaped holding dog 40 is a pusher nose 43, the lower front edge of which abuts against the upper limb of the collar D of the hose clamp when the band C is being tensioned, as will be later explained. Formed on the rear end of the pusher nose 43 is a bearing surface 44.

A generally yoke-shaped lever 45 is provided on the upper part of the forging 37 for raising the holding dog 40 and the pusher nose 43. The lever 45 is provided with a ball handle 46 to facilitate grasping the same, and on the underside of the lever 45 the downwardly extending yoke legs thereof are pivotally received on a pivot pin 47 that is mounted across the channeled upper portion of the forging 37, thereby permitting the lever 45 to be pivoted from the position thereof illustrated in FIG. 6. A spring 48 is disposed between the underside of the bight portion of the yoke-shaped holding dog 40 and the top of the pusher nose 43 so that the pusher nose 43 is biased in the counterclockwise direction and the holding dog 40 is biased in the clockwise direction (as viewed in FIG. 6). The bight portion of the lever 45 is adapted to engage the bearing surface 42 of the holding dog 40, while the legs of the lever 45 are adapted to engage the bearing surface 44 on the pusher nose 43. Thus, it will be understood that, by pulling the lever 45 forward, i.e., in the counterclockwise direction as viewed in FIG. 6, the pusher nose 43 will be rotated clockwise and the holding dog 40 will be rotated counterclockwise for lifting both of these members against the urging of the spring 48 to facilitate insertion of the free end portion E of the hose clamp into the machine and into the slideway provided in the forging 37.

Slidably mounted on the rod 30, to the rear of the forgoing 37 is a puller housing 50, the upper portion of which is longitudinally channeled for the purpose of receiving the free end portion E of the coils C of the hose clamp. Within the channel of this puller housing 50 a pulling dog 51 is pivotally mounted on a cross pin 52, the pulling dog 51 having teeth 53 on its lower surface for gripping the free end portion E of the clamp. The puller dog 50 is normally held in its working position (see FIGS. 6 and 7) by a thrust spring 54 that encircles a short lever arm 55, the lower end of which is articulated in the pulling dog 51 and the upper end of which is coiled around a fulcrum pin 56 located in the upper portion of the puller housing 50, and continuous with the coils there is a rearwardly extending loop-shaped lever arm 57. The spring 54 is confined between an upper washer 58 and a plate 59, the latter of which bears against the pulling dog 51 and is provided with an aperture through which the arm 55 extends. It will thus be understood that, by depressing the loop-shaped lever arm 57, the pulling dog 51 may be raised out of contact with the free end portion E of the hose clamp.

A punch head 60 is forged with a pair of rearwardly extending arms 61 that straddle the upper channeled portion of the forging 37 and are pivotally supported on the outer ends of the pivot pin 47. The punch head 60 overhangs the work receiving block 21 and is provided on its underside with a hardened steel pointed punch 62 which, when a hose clamp is being applied to a hose by the present machine, rests upon the top limb of the collar D of the clamp. After the clamp has been tightened, as hereinafter explained, the punch head 60 is utilized to lock the clamp in its tightened condition by being struck with a mallet or hammer to drive the punch 62 downwardly into the top of the collar D. This produces a series of offset lugs from the upper limb of the collar and the underlying coils of the clamp, the lugs being internested with each other so that the clamp is locked against reexpansion or loosening of its coils.

Mounted on the tool baseplate 20 immediately rearwardly of the work receiving block 21 is a punch head support block 64 on which the punch head 60 and the associated components on the rod 30 may rest when a hose is not in position on the work receiving block 21.

Figure 5:
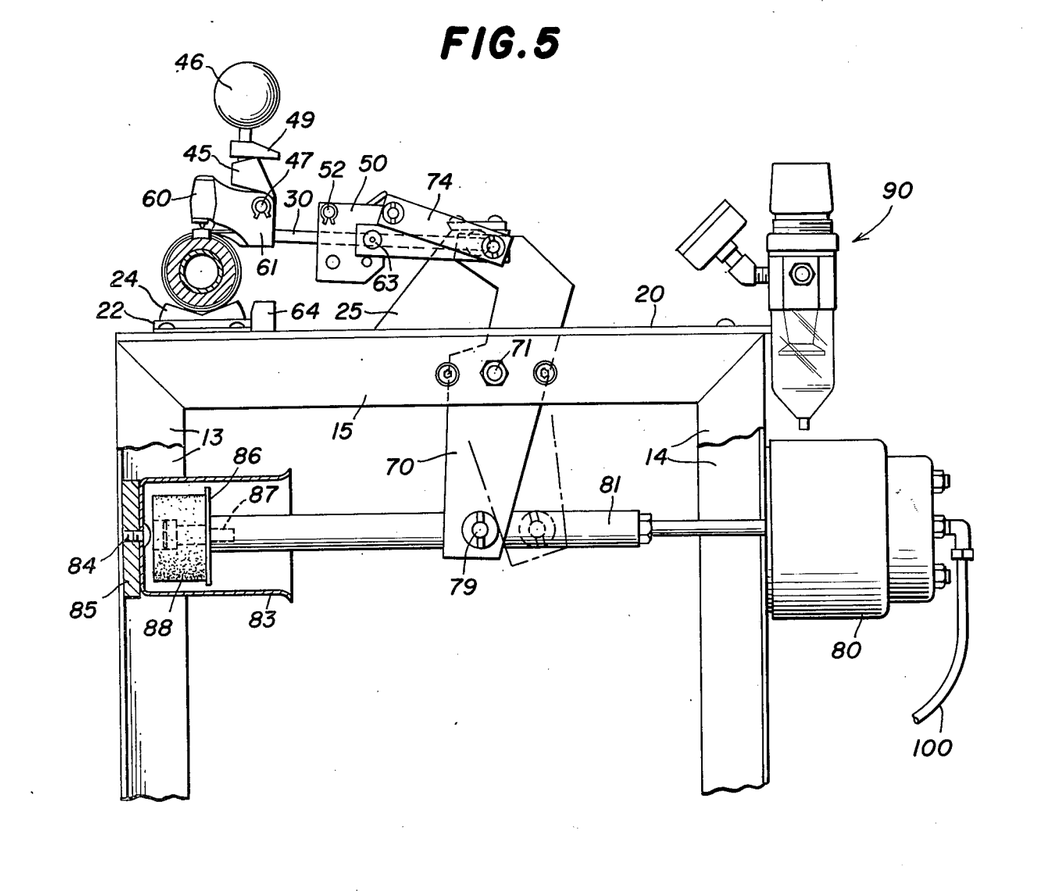
FIG. 5 is a fragmentary view similar to FIG. 1, illustrating the machine at the end of a drive or band-pulling stroke.

Referring now also to FIG. 5 of the drawings, there are respectively received in the opposite sides of the puller housing 50 substantially perpendicular to the longitudinal axis of the rod 30 a pair of pivot screws 63 to which are respectively pivoted the forward ends of a pair of links 65, the rear ends of which are respectively pivoted on stub shafts 66 which are in turn respectively carried by the upper ends of two bell crank levers 70. The bell crank levers 70 are respectively disposed along opposite sides of the tool pivot block 25 and are respectively received through the slots 36 in the tool baseplate 20, the bell crank levers 70 being pivotally mounted on a pivot shaft 71 which is carried by a pivot block 72 secured between the top angle members 15 and beneath the tool baseplate 20. Also respectively pivotally mounted on the stub shafts 66 outboard of the links 65 are the rear ends of two cutter links 74, the forward ends of which extend forwardly adjacent to the puller housing 50. A severing block 75 is fixedly secured between the forward ends of the cutter links 74 by pins 76 and 77, the rear end of the severing block 75 having formed thereon a transversely extending cutting edge 78 (see FIG. 1).

Figure 4:
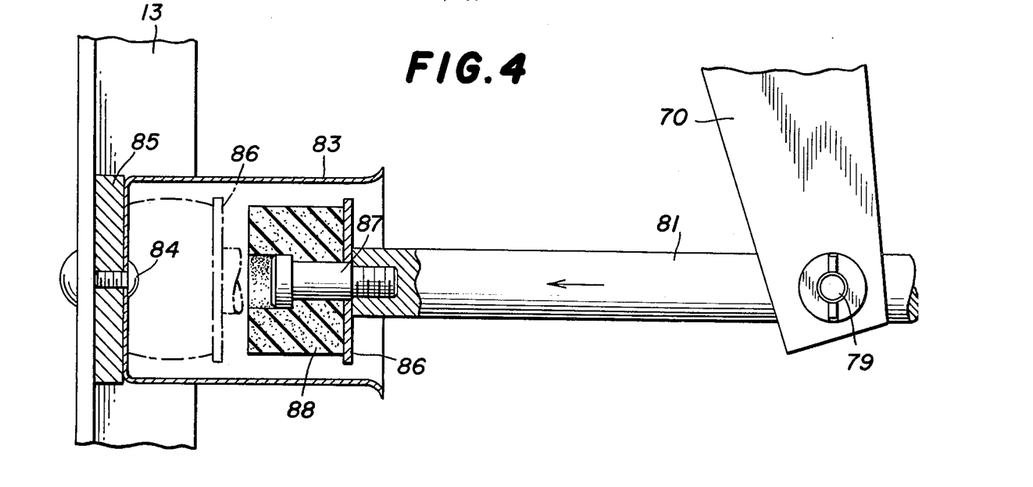
FIG. 4 is a fragmentary view in vertical section taken along the line 4—4 in FIG. 3.

The lower ends of the bell crank levers 70 straddle the piston rod 81 of a reciprocating air motor 80 and are pivotally secured thereto intermediate the ends thereof by a pivot pin 79. The air motor 80 is fixedly secured to the outer surfaces of the rear angle members 14 adjacent to the upper ends thereof, with the piston rod 81 extending therebetween substantially horizontally toward the front angle members 13. The piston of the air motor 80 is spring biased with a force of approximately 65 pounds to a normally retracted or rest position, illustrated in FIG. 1. Referring also to FIG. 4 of the drawings, fixedly mounted on the inner surfaces of the front angle members 13 opposite the air motor 80 is a generally cup-shaped cylindrical receptacle 83 having a circular bottom wall which is spaced from the adjacent flanges of the front angle members 13 by a cushioning pad 85 and is fixedly secured thereto by suitable screws 84. The piston rod 81 is provided at the distal end thereof with an end plate 86 to which is secured a resilient spring or cushion member 88 by a mounting screw 87, the screw 87 being completely recessed within the cushion member 88. The cushion member 88 and the adjacent end of the piston rod 81 are received in the open end of the receptacle 83 substantially coaxially therewith, with the cushion member 88 being adapted to engage the closed end of the receptacle 83 at the end of the driving stroke of the air motor 80 to cushion the piston rod 81 and prevent violent bottoming out of the piston of the air motor 80.

The machine 10 is provided with a filter, regulator and lubricator unit, generally designated by the numeral 90, which is preferably mounted at the rear end of the tool baseplate 20 (see FIGS. 2 and 5). The unit 90 includes an air filter 91 provided with an inlet nipple 95 for coupling to an associated source of pressurized air. More particularly, the machine 10 of the present invention is adapted to be coupled by a conduit having a ¼ inch inner diameter to the associated pressurized air source, the supply line pressure preferably being in the range of from about 75 p.s.i. to about 125 p.s.i. at 3 cu. ft. per min. Coupled to the filter 91 by a regulator 93 is a lubricator 92, the regulator 93 being provided with a pressure gauge 94 and being manually adjustable for varying the pressure of the air stream at the output thereof. The lubricator 92 is coupled by an outlet conduit 96 to the input port of a control valve 97 which is mounted on the front brace plate 17, the valve 97 being operable between open and closed conditions by a foot pedal 98 which extends forwardly through a complementary opening in the upstanding flange of the brace plate 17 and is protected by a covering hood 99. The outlet port of the valve 97 is coupled by a conduit 100 to the input port of the air motor 80. Preferably, the conduits 96 and 100 are polyethylene hoses having a 3/16 inch outer diameter and a ⅛ inch inner diameter.

When an operator desires to apply a hose clamp by means of the machine 10 of the present invention, the operator should first check to insure that the air pressure regulator 93 is properly set to provide air at the proper predetermined pressure. For example, it has been found that in applying various clamps manufactured by the Punch-Lok Company, the following pressure settings are applicable: 30 pounds for ⅜ inch-wide clamps; 40 pounds for ⅝ inch-wide standard-duty clamps; and 55 pounds for ⅝ inch heavy-duty clamps. The operator then slips a hose clamp into the machine.

This will require lifting the forward end of the apparatus upward off the support block 64 and placing the hose clamp upon the work receiving V-seat 24. At the time the hose clamp is so positioned, the free end E of the clamp is fed into the machine, i.e., into the slideways provided in the forging 37 and the puller housing 50. Insertion of the free end E of the hose clamp into the machine 10 is facilitated by raising the pusher nose 43 and the yoke-shaped holding dog 40. This is accomplished by pivoting the lever 45 forwardly, as explained above. At the same time, the extremity of the free end E of the clamp will pass rearwardly under the pulling dog 51, automatically raising the dog 51 to admit the free end E thereunder.

The free end E of the clamp is pushed longitudnally through the slideways of the forging 37 and the puller housing 50 until the clamp is brought to the position shown in FIG. 6, whereupon the lever 45 is released to cause the holding dog 40 and the pusher nose 43 to return to their normal positions wherein the teeth 41 of the holding dog 40 will be in contact with the upper surface of the free end E of the clamp and the forward end of the pusher nose 43 will abut one side of the upper transverse limb of the clamp collar D. The compression of the thrust spring 54 in the puller housing 50 will, of course, cause the teeth 53 of the pulling dog 51 likewise to bear against the upper surface of the free end portion E of the hose clamp. When the hose clamp has been thus positioned in the machine 10, the operator may then place a nipple B in the end of the hose A, and the hose end is then placed through the coils of the clamp.

Having positioned the hose A and the hose clamp as described above, the operator is then ready to cause the machine 10 to tension the coils C of the clamp about the hose A. In order to do this, the operator simply depresses the foot pedal 98 to open the valve 97 to admit air at the predetermined pressure to the air motor 80, which causes the piston rod 81 to begin its drive stroke from the position illustrated in solid line in FIG. 4 toward the position illustrated in broken line in FIG. 4. This reciprocating movement of the piston rod 81 pivots the bell crank levers 70 in a clockwise direction about the axis of the pivot pin 71, thereby operating through the links 65 to pull the puller housing 50 and slide it rearwardly along the rod 30 from the position illustrated in FIG. 6 to the position illustrated in FIG. 7. During this movement, the teeth 53 of the pulling dog 51 will dig deeper into the upper surface of the free end E of the clamp, and will pull the free end E to the right to tighten the coils C about the hose A.

In the preferred embodiment of the invention, the dimensions and mounting position of the bell crank levers 70 are such that during the driving stroke of the piston rod 81 toward the left, as viewed in FIG. 5, the puller housing 50 will be moved to the right through a band-pulling stroke over a distance of approximately 2 inches, which will normally be sufficient to tighten the coils C of the clamp to the predetermined desired tension for securing the clamp tightly about the hose A. When this predetermined tension has been reached, the air motor 80 will stall out. With the machine 10 still in its stalled condition, and the foot pedal 98 still depressed, the operator strikes the punch head 60 sharply with a mallet or the like, thereby driving the punch 62 downwardly into the collar D and causing nipples to be offset in internested fashion in the outer limb of the collar D and in the lapped coils C within the collar. This securely locks the coils C of the clamp in their tensioned condition about the hose A.

After the punch head 60 has been struck to lock the hose clamp in its tensioned condition as just described, the free end E of the hose clamp is broken from the clamp at the right-hand edge of the collar D as viewed in FIGS. 6 and 7. This is accomplished by grasping the hose by the hands and twisting it upwardly to break off the free end portion E of the band against the forward portion of the pusher nose 43.

Inasmuch as the valve 97 remains open and the air motor 80 is held in its stalled condition when the free end portion E is broken from the hose clamp, it will be appreciated that the air pressure in the air motor 80 will cause the piston rod 81 thereof to be driven rather violently toward the end of the drive stroke (to the left, as viewed in FIG. 5) at the instant the free end portion E of the hose clamp is broken and the tension therein is relieved. Damage to the machine 10 and particularly the air motor 80 is, however, avoided by engagement of the cushion member 88 with the bottom of the receptacle 83, the cushion member 88 being compressed and absorbing the force of the impact. The cushion pad 85 also helps to absorb this impact force and prevent damage to the front angle members 13.

It is an important feature of the present invention that the air is supplied to the air motor 80 at a controlled rate through the valve 97. More particularly, the small inner diameter of the conduits 96 and 100, which is less than the inner diameter of the supply conduit connected to the inlet nipple 95, is such that the resistance thereof slows down the air stream and supplies it at a controlled rate to the air motor 80, thereby controlling the speed of the driving and exhaust strokes of the piston rod 81. In particular, the tensioning stroke takes approximately 2/5 to 3/5 second. Preferably, when the machine stalls during the band-pulling stroke when the predetermined tension in the band has been reached, the operator should pause momentarily before striking the punch head 60 to complete the locking operation. This pause is necessary because most of the hoses to which the clamps are to be applied are formed of rubber, which flows rather than compresses under stress. Thus, this pause allows time for the clamp to pull up tight as the rubber outer covering and inner tube of the hose thin out, under pressure, within the clamp.

Normally, if the band loops C have been set at the proper diameter before insertion of the hose A therein, only one stroke of the machine 10 will be necessary to tension the band to the predetermined tension. However, in the event that the band is initially too loosely wrapped around the hose, the air motor can readily be operated through repeated tensioning strokes until the band has been brought to the predetermined tension. Thus, if the piston rod 81 bottoms out on the frist stroke without having stalled, the foot pedal 98 is released, closing the valve and permitting the air to exhaust from the air motor 80, and allowing the piston rod 81 to be retracted under the urging of its associated spring. During this exhaust stroke the holding dog 40 maintains the tension in the coils C and prevents the free end portion E of the band from backing up, while the pulling dog will pivot in a counterclockwise direction, as viewed in FIG. 7, against the urging of the thrust spring 54 to permit the puller housing 50 to slide back along the free end portion E to regrip it adjacent to the forging 37 for the next tensioning stroke. Then the foot pedal 98 is again depressed to reopen the valve 97 and initiate another driving stroke of the piston rod 81. This process can be repeated until the predetermined tension has been reached.

After the tensioned clamp has been locked by the punching operation and the free end portion E thereof has been broken off, the foot pedal 98 is actuated two or three times to work the free end portion E through the holding dog 40, after which the free end portion E can be bent up 1 or 2 inches from its end and manually pulled rearwardly from the pulling dog 51. If necessary, the lever arm 57 may be depressed to raise the pulling dog 51 to facilitate this operation.

As a safety precaution, when the machine 10 is being used to apply a clamp to a hose, the cutter links 74 are pivoted clockwise, as viewed in FIG. 5, to an inoperative position extending rearwardly from the bell crank lever 70, so as not to interfere with the operation of the puller housing 50. When it is desired to utilize the machine 10 to remove a clamp from a hose, the cutter links 74 are pivoted back to their operative position illustrated in FIG. 5, and the punch head 60 is allowed to rest upon the support block 64. The regulator 93 is adjusted to set the line pressure at 60 p.s.i. The clamp remover stop 49 is attached to the handle 46 of the lever 45. For this purpose, the stop member 49 may be provided with an opening therethrough for receiving the handle stem and a setscrew for fixedly securing the stop member 49 in place on the handle. The ball at the end of the handle 46 is removable for this purpose. It will be appreciated that several different sizes of stop member 49 may be provided with the machine 10 for use in removing different sizes of clamp collars in the manner to be described below.

To set the stop member 49, the foot pedal 98 is depressed slightly to open the valve 97 and move the puller housing 50 rearwardly along the rod 30. Then the lever 45 is rotated downwardly to the rear, i.e., clockwise as viewed in FIG. 5, to move the stop member 49 in front of the puller housing 50 until it engages the rod 30. Then, the foot pedal 98 can be released allowing the puller housing 50 to return along the rod 30 until it engages the stop member 49 and is stopped thereby. When the puller housing 50 is thus positioned by the stop member 49, the movable cutting edge 78 will be properly spaced from the fixed cutting edge 35 to receive therebetween the clamp collar D to be cut and removed, as is explained in greater detail in the aforementioned U.S. Pat. No. 3,027,788.

Then, the foot pedal 98 is again depressed to open the valve 97 and initiate a driving stroke of the piston rod 81, for driving the movable cutting edge 78 rearwardly toward the fixed cutting edge 35 and cooperating therewith to shear or sever the clamp collar D, thereby releasing the band C from the associated hose. If necessary, the piston rod 81 may be operated through several successive driving strokes to achieve a complete severing of the clamp collar D. It will be appreciated that the cap plate 32 and the severing block 75 are both readily removable for servicing thereof and sharpening of the cutting edges 35 and 78.

In a constructional model of the machine 10, the air filter 91 may be of the type manufactured by Watts Regulator Co., Model F10, the lubricator 92 may be of the type manufactured by Watts Regulator Co., type L10, and the regulator 93 may be of the type manufactured by Watts Regulator Co., type R10. The return spring on the piston of the air motor 80 exerts a force of 65 pounds, and the air motor 80 produces a total force on its piston of 1600 pounds, resulting in a net force available to the pusher housing 50 of approximately 1535 pounds.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A hose clamp applying machine for producing a predetermined tension in the metal band of a hose clamp, said machine comprising a slide member, band-pulling means mounted for sliding reciprocation on said slide member and adapted to engage the band, a reciprocating drive motor including an output shaft disposed for reciprocating movement in a direction substantially parallel to the direction of said slide member, and drive linkage providing interconnection between said band-pulling means and said output shaft intermediate the ends thereof and mounted for pivotal movement about a fixed axis disposed substantially normal to the direction of said slide member approximately midway between said slide member and said motor output shaft, said fixed axis being spaced from said slide member a distance such that said drive linkage is responsive to a single drive stroke of said drive motor output shaft for driving said band-pulling means along said slide member a distance sufficient completely to tension the associated band to said predetermined tension.

2. The hose clamp applying machine set forth in claim 1, wherein the distance through which said band-pulling means moves during a single drive stroke of said drive motor is approximately 2 inches.

3. A hose clamp applying machine for producing a predetermined tension in the metal band of a hose clamp, said machine comprising a frame, a slide member mounted on said frame, band-pulling means mounted for sliding reciprocation on said slide member and adapted to engage the band, a reciprocating fluid-driven drive motor mounted on said frame, drive linkage interconnecting said drive motor and said band-pulling means and mounted for pivotal movement about a fixed axis disposed substantially normal to the direction of said slide member, said fixed axis being spaced from said slide member a distance such that said drive linkage is responsive to a single drive stroke of said drive motor for driving said band-pulling means along said slide member a distance sufficient completely to tension the associated band to said predetermined tension, fluid supply means carried by said frame, first conduit having a first inner diameter coupled to said fluid supply means and adapted to be coupled to an associated source of driving fluid, and a second conduit having a second inner diameter less than the first inner diameter and coupled between said fluid supply means and said drive motor for supplying driving fluid thereto while attenuating the flow of driving fluid for controlling the speed of the reciprocating movement of said drive motor.

4. The hose clamp applying machine set forth in claim 3, and further including valve means coupled to said drive motor and adapted to be coupled to an associated source of driving fluid, said valve means having a drive condition for applying driving fluid to said drive motor and an exhaust condition for interrupting the supply of driving fluid to said drive motor and accommodating exhausting of drive fluid therefrom, said valve means being selectively operable between the drive and exhaust conditions thereof.

5. A hose clamp applying machine for producing a predetermined tension in the metal band of a hose clamp, said machine comprising a frame, a slide member mounted on said frame, band-pulling means mounted for sliding reciprocation on said slide member and adapted to engage the band, a reciprocating drive motor mounted on said frame having a cylinder and a piston which is operable alternately through band-pulling and return strokes, drive linkage interconnecting said piston and said band-pulling means and responsive to reciprocation of said drive motor for moving said band-pulling means between a retracted position and a fully extended position for tensioning the associated band, a resilient cushioning member coupled to said piston for movement therewith, and a receptacle mounted on said frame and dimensioned for receiving and confining said cushioning member throughout the band-pulling and return strokes of said piston and adapted for engagement therewith during the band-pulling stroke of said piston to cushion said piston when the band is severed while under tension.

6. The hose clamp applying machine set forth in claim 5, wherein said cushioning member is formed of rubber.

7. The hose clamp applying machine set forth in claim 5, wherein said receptacle comprises a cup-like member having a generally cylindrical side wall disposed substantially coaxially with said piston and a generally circular bottom wall, and further including an impact-resistant pad interposed between said receptacle and said frame.

8. The hose clamp applying machine set forth in claim 5, wherein said piston rod is disposed for substantially horizontal reciprocating movement.

9. A hose clamp applying machine for producing a predetermined tension in the metal band of a hose clamp, said machine comprising a frame, a slide member mounted on said frame, band-pulling means mounted for sliding reciprocation on said slide member and adapted to engage the band, a reciprocating drive motor mounted on said frame having a cylinder and a piston which is operable alternately through band-pulling and return strokes, drive linkage interconnecting said piston and said band-pulling means and mounted for pivotal movement about a fixed axis disposed substantially normal to the direction of said slide member, said fixed axis being spaced from said slide member a distance such that said drive linkage is responsive to a single drive stroke of said drive motor for driving said band-pulling means along said slide member a distance sufficient completely to tension the associated band to said predetermined tension, a resilient cushioning member coupled to said piston for movement therewith, and a receptacle mounted on said frame and dimensioned for receiving and confining said cushioning member throughout the band-pulling and return strokes of said piston and adapted for engagement therewith during the band-pulling stroke of said piston to cushion said piston when the band is severed while under tension.

10. The hose clamp applying machine set forth in claim 9, wherein said drive motor comprises a fluid-driven motor, and further including fluid supply means carried by said frame and adapted to be coupled to an associated source of driving fluid by a first conduit having a second inner diameter less than the first inner diameter and coupled between said fluid supply means and said drive motor for supplying driving fluid thereto while attenuating the flow of driving fluid for controlling the speed of the reciprocating movement of said drive motor.

11. A hose clamp machine for applying and removing a hose clamp including a tensionable metal band and a locking collar for locking the band in a tensioned condition, said machine comprising a base, a slide member mounted on said base, band-pulling means mounted for sliding reciprocation on said slide member and adapted to engage the band, a reciprocating drive motor resiliently urged to a rest position, drive linkage interconnecting said drive motor and said band-pulling means and responsive to reciprocation of said drive motor for moving said band-pulling means between a retracted position corresponding to said rest position of said drive motor and a fully extended position for tensioning the associated band, a fixed cutting member mounted on said base, a movable cutting member carried by said band-pulling means for cooperation with said fixed cutting means to sever an associated hose clamp locking collar disposed therebetween as said band-pulling means moves from a predetermined cutting position to the fully extended position thereof, and a stop member carried by said slide member and movable with respect thereto to a holding position engageable with said band-pulling means for holding it in said predetermined cutting position and preventing return thereof to the retracted position thereof.

12. The hose clamp machine set forth in claim 11, wherein said stop member is pivotally mounted on said slide member for movement between a retracted position and said holding position.

13. The hose clamp machine set forth in claim 11, wherein said drive motor comprises a fluid-driven motor, and further including regulating means coupled to said drive motor and adapted to be coupled to an associated source of driving fluid, said regulating means being adjustable for applying driving fluid to said drive motor at a first pressure when said machine is operating in a band-tensioning mode and at a second pressure when said machine is operating at a band-removing mode.

* * * * *